United States Patent
Matysik

(10) Patent No.: US 10,254,182 B2
(45) Date of Patent: Apr. 9, 2019

(54) ARRANGEMENT FOR MEASURING A FORCE OR MOMENT ON A HOLLOW-CYLINDRICAL MACHINE ELEMENT

(71) Applicant: Schaeffler Technologies AG & Co. KG, Herzogenaurach (DE)

(72) Inventor: Jan Matysik, Nuremberg (DE)

(73) Assignee: SCHAEFFLER TECHNOLOGIES AG & CO. KG, Herzogenaurach (DE)

(*) Notice: Subject to any disclaimer, the term of this patent is extended or adjusted under 35 U.S.C. 154(b) by 158 days.

(21) Appl. No.: 15/120,619

(22) PCT Filed: Dec. 5, 2014

(86) PCT No.: PCT/DE2014/200681
§ 371 (c)(1),
(2) Date: Aug. 22, 2016

(87) PCT Pub. No.: WO2015/131863
PCT Pub. Date: Sep. 11, 2015

(65) Prior Publication Data
US 2017/0010165 A1    Jan. 12, 2017

(30) Foreign Application Priority Data

Mar. 5, 2014 (DE) .................. 10 2014 204 010

(51) Int. Cl.
*G01L 1/12* (2006.01)
*G01L 3/10* (2006.01)

(52) U.S. Cl.
CPC .............. *G01L 3/102* (2013.01); *G01L 3/101* (2013.01); *G01L 3/104* (2013.01)

(58) Field of Classification Search
CPC ......... G01L 3/102; G01L 3/101; G01L 3/104; G01L 3/10; G01L 3/24; G01L 1/12; G01L 5/161; G01B 5/30
See application file for complete search history.

(56) References Cited

U.S. PATENT DOCUMENTS 5,706,572 A    1/1998  Garshelis
6,145,387 A *  11/2000 Garshelis ................ G01L 3/102
                                                          324/207.21

(Continued)

FOREIGN PATENT DOCUMENTS

DE    69222588    10/1997
DE    60007641    11/2004

(Continued)

*Primary Examiner* — Lisa M Caputo
*Assistant Examiner* — Nigel Plumb
(74) *Attorney, Agent, or Firm* — Volpe and Koenig, P.C.

(57) ABSTRACT

The present invention relates to an arrangement for measuring a force and/or moment on a hollow-cylindrical machine element, using the inverse magnetostrictive effect. The machine element extends in an axis and has a sensor region of hollow cylinder-type basic shape. This sensor region has a permanent magnetization or the arrangement comprises magnetizing elements for magnetizing the sensor region. The arrangement further comprises at least one magnetic field sensor which is designed to measure at least one component of a magnetic field brought about by the magnetization of the sensor region and by the magnetic field caused by the force to be measured and/or by the moment to be measured. According to the invention, the machine element, in the hollow space defined by the hollow cylinder-type basic shape, has a wall-type longitudinal structure.

11 Claims, 2 Drawing Sheets

(56) References Cited

U.S. PATENT DOCUMENTS

| | | |
|---|---|---|
| 6,581,480 B1 | 6/2003 | May et al. |
| 6,776,057 B1 | 8/2004 | May |
| 6,810,754 B2 | 11/2004 | May |
| 7,140,258 B2 | 11/2006 | May |
| 8,191,431 B2 | 6/2012 | Hedayat et al. |
| 9,587,996 B2 * | 3/2017 | Matysik .................. B05D 7/14 |
| 2008/0053250 A1 * | 3/2008 | Yoneda .................. G01L 3/102 |
| | | 73/862.333 |
| 2010/0101336 A1 * | 4/2010 | Yamakawa ............. G01L 3/102 |
| | | 73/862.333 |
| 2010/0263962 A1 * | 10/2010 | Shimizu .................. B62D 5/04 |
| | | 180/446 |
| 2012/0111295 A1 * | 5/2012 | Plate ....................... F01L 1/344 |
| | | 123/90.15 |
| 2016/0327443 A1 * | 11/2016 | Matysik .................. G01L 1/125 |
| 2017/0276556 A1 * | 9/2017 | Neuschaefer-Rube ..................... |
| | | G01L 3/102 |
| 2017/0370784 A1 * | 12/2017 | Neuschaefer-Rube ..................... |
| | | G01L 3/102 |
| 2017/0370788 A1 * | 12/2017 | Neuschaefer-Rube ..................... |
| | | G01L 3/102 |

FOREIGN PATENT DOCUMENTS

| | | |
|---|---|---|
| DE | 60008543 | 12/2004 |
| DE | 60105794 | 2/2006 |
| DE | 60309678 | 9/2007 |
| DE | 69936138 | 2/2008 |
| DE | 69838904 | 1/2009 |
| EP | 2216702 | 8/2010 |
| WO | 9921150 | 4/1999 |
| WO | 0127638 | 4/2001 |
| WO | 2006053244 | 5/2006 |
| WO | 2007048143 | 4/2007 |
| WO | 2011085400 | 7/2011 |

* cited by examiner

ARRANGEMENT FOR MEASURING A FORCE OR MOMENT ON A HOLLOW-CYLINDRICAL MACHINE ELEMENT

BACKGROUND

The present invention relates to an arrangement for measuring a force and/or a moment on a hollow-cylindrical machine element using the inverse-magnetostrictive effect.

From DE 600 08 543 T2, a converter element is known that is provided for use in a torque or force sensor. The converter element is provided integrally in a shaft made from a material that can be magnetized with its magnetization oriented in an axial direction.

DE 600 07 641 T2 shows a converter element that is provided for a torque or force sensor converter. In this converter element, magnetizations are formed in a radially inner region and in a radially outer region.

From DE 603 09 678 T2, a method for detecting a torque in a shaft is known in which magnetic fields with alternating polarity are generated that are measured with a sensor arrangement.

DE 601 05 794 T2 shows a force-sensitive converter element with a body made from magnetic material, wherein, in the body, at least magnetized regions are formed that extend at an angle to the force-transmission direction and have opposite magnetization polarities.

DE 699 36 138 T2 shows a magnetic force sensor in which a magnetized material is exposed to a bending moment, wherein, with the help of a sensor arrangement, the outer magnetic field of the magnetized material can be determined.

WO 2011/085400 A1 shows a magnetoelastic force sensor with which mechanical loads of an element can be measured. The element has a tangential magnetization and is loaded with a bending moment. A magnetic field sensor is located on a middle plane.

From DE 692 22 588 T2, an annular magnetized torque sensor is known.

WO 2007/048143 A2 teaches a sensor with a magnetized shaft.

WO 01/27638 A1 shows an oscillation sensor with a shaft that is magnetized circumferentially or longitudinally.

From WO 2006/053244 A2, a torque sensor is known that comprises a magnetization of a rotating shaft. The magnetization has a circumferential configuration.

U.S. Pat. No. 8,191,431 B2 shows a sensor with a magnetized shaft in which at least two magnetically active areas extend in the axial direction.

From DE 698 38 904 T2 and EP 2 216 702 A1, a torque sensor with circular magnetization is known. One disadvantage of this torque sensor is that it is not suitable for measuring bending moments.

SUMMARY

Starting with the prior art, the object of the present invention is to expand the possibilities for measuring forces and moments on hollow-cylindrical machine elements using the inverse-magnetostrictive effect.

The specified objective is achieved by an arrangement according to the invention.

The arrangement according to the invention is used for measuring a force and/or a moment on a machine element extending along an axis. The force or the moment acts on the machine element, which produces mechanical stresses and in most cases slightly deforms the machine element.

The machine element has a sensor area that forms an integral component of the machine element and is at least partially exposed to the force to be measured or the moment to be measured. In any case, the force or the moment on the machine element leads to a force in the sensor area of the machine element that represents a measuring device for the force to be measured or the moment to be measured. The sensor area has a hollow-cylindrical base shape. The axis of the machine element also forms the axis of the hollow-cylindrical base shape. Preferably, the machine element already has a hollow-cylindrical base shape, wherein the sensor area is formed by an axial section of the machine element. The sensor area could also extend over the entire machine element, so that the sensor area and the machine element are identical.

The sensor area is magnetized or can be magnetized. The sensor area is magnetized by a magnetization in the form of a permanent magnetization or the arrangement further comprises magnetizing elements for the temporary magnetization of the sensor area. In any case, the sensor area is magnetized in an operating state of the arrangement.

The sensor area could also be viewed as a primary sensor. In the sensor area, due to the inverse-magnetostrictive effect, a force occurring in the sensor area is converted into a magnetic field. Accordingly, the arrangement according to the invention further comprises at least one magnetic field sensor that is arranged in or opposite the machine element. The magnetic field sensor is used for determining a magnetic field and is formed for measuring at least one vector component of a magnetic field that emerges from the machine element and is caused on one hand by the magnetization of the sensor area and on the other hand by the effective force and/or by the effective moment. With the help of the at least one magnetic field sensor, it is possible to measure the magnetic field that occurs due to the inverse-magnetostrictive effect based on the magnetization of the sensor area and due to the force acting on the machine element or the moment acting on the machine element.

According to the invention, the machine element has a wall-like longitudinal structure in the hollow space of the hollow-cylindrical base shape. The wall-like longitudinal structure extends at least partially in the direction of the axis through the hollow space of the hollow-cylindrical base shape, in particular, also perpendicular with respect to a cross section of the machine element. The wall-like longitudinal structure also has the described magnetization as part of the sensor area. The forces and moments acting on the machine element also lead in the wall-like longitudinal structure to corresponding stresses. In particular, torsional moments, bending moments, and transverse forces that act on the machine element lead to stresses in the wall-like longitudinal structure that can be measured with the magnetic field sensor. For example, a bending moment acting on the machine element leads to a shearing force that acts on the wall-like longitudinal structure and can be measured with the magnetic field sensor.

The cylindrical hollow space of the hollow-cylindrical base shape is modified by the wall-like longitudinal structure, for example, such that it is divided by the wall-like longitudinal structure into two cylindrical sector-shaped partial hollow spaces.

One special advantage of the arrangement according to the invention is that due to the extension of the shaping of the machine element that can be realized with low expense, the possibilities for measuring forces and moments on the machine element are significantly expanded. The results of the measurements oriented to the wall-like longitudinal structure can also be used to improve the results of the measurements oriented to the hollow-cylindrical shape. Another advantage is that externally occurring magnetic fields close via the wall-like longitudinal structure until these are magnetically saturated. The effect of such externally occurring magnetic fields is thus limited to a partial section of the machine element.

The wall-like longitudinal structure preferably forms an integral component of the machine element. The wall-like longitudinal structure is also preferably an integral component of the sensor area and is preferably made from the same material. The wall-like longitudinal structure is preferably constructed integrally with the rest of the sensor area or the rest of the machine element. Alternatively, the wall-like longitudinal structure can also be made from a different material than the rest of the machine element, for example, than a component installed at a later time into the hollow-cylindrical base shape. The wall-like longitudinal structure can also have a layer-like construction.

The machine element preferably forms a component of the arrangement. The sensor area is preferably formed by a three-dimensional partial area of the volume of the machine element.

The wall-like longitudinal structure is preferably flat, i.e., it has at least one flat surface, for example as a single flat wall surface or as a flat rectangular solid.

The wall-like longitudinal structure preferably extends in a plane whose normal vector has a radial directional component. Consequently, the wall-like longitudinal structure does not extend exclusively in a radial plane, i.e., not in a plane arranged perpendicular to the axis. The extent of the wall-like longitudinal structure is defined by its surface located in the hollow space of the hollow-cylindrical base shape. If the wall-like longitudinal structure is formed by a flat body, for example, by a flat rectangular solid, the extent can also be defined by a middle plane of the wall-like longitudinal structure.

The wall-like longitudinal structure extends in an especially preferred way in a plane parallel to the axis, so that the cylindrical hollow space of the hollow-cylindrical base shape is modified by the wall-like longitudinal structure equally in the axial direction.

In an especially preferred way, the wall-like longitudinal structure extends in a plane encompassing the axis. Consequently, the cylindrically hollow space of the hollow-cylindrical base shape is divided symmetrically by the wall-like longitudinal structure in cross section.

For preferred embodiments of the arrangement according to the invention, the wall-like longitudinal structure divides the hollow space of the hollow-cylindrical base shape into hollow cylindrical sectors. The hollow cylindrical sectors each have the shape of a circular sector in cross section. The number of hollow-cylindrical sectors is preferably one, two, three, or four.

The hollow cylindrical sectors each preferably have a central angle that is 180° or a whole number fraction of 180°.

For the above description of the hollow-cylindrical sectors, the thickness of the wall-like longitudinal structure is neglected, because this thickness is preferably relatively small relative to the other dimensions of the machine element.

Preferably, the wall-like longitudinal structure has the shape of a flat rectangular solid. The wall-like longitudinal structure thus forms a crossing piece that runs through the cylindrical hollow space of the hollow-cylindrical base shape and divides this hollow space preferably into hollow-cylindrical sectors.

In one simple embodiment, only one of the cylindrical sector-shaped hollow spaces is formed. For this purpose, starting from the wall surface, the wall-like longitudinal structure is formed on one side completely up to the inside of the hollow-cylindrical base shape. Here, the wall-like longitudinal structure preferably has the shape of a cylindrical sector with a central angle of 180°, i.e., the shape of a half cylinder produced through longitudinal division, wherein the plane of partition represents the wall surface. Accordingly, the cylinder sector-shaped hollow space also has a central angle of 180°. The cylindrical sector shape of the wall-like longitudinal structure and the cylindrical sector shape of the hollow space are then given in this embodiment when the wall surface surrounds the axis. The wall surface can also be arranged somewhat at a distance to the axis, so that the wall-like longitudinal structure and the remaining hollow space are each formed with a cylindrical segment-like shape.

In preferred embodiments, the machine element has exactly one of the wall-like longitudinal structures that has the shape of a flat rectangular solid and lies on the axis so that two of the cylindrical sector-shaped hollow spaces are formed that each have a central angle of 180°.

In preferred embodiments, the machine element has two of the wall-like longitudinal structures that cross each other, so that four of the cylinder sector-shaped hollow spaces are formed. The two wall-like longitudinal structures thus together have a cross-shaped cross section. Here, the two wall-like longitudinal structures preferably each have the shape of a flat rectangular solid. The two wall-like longitudinal structures each have a line of symmetry in the axial direction, wherein the two wall-like longitudinal structures preferably cross at their lines of symmetry. Here, the two wall-like longitudinal structures have an angle of 90° to each other at their intersecting line. The two wall-like longitudinal structures preferably cross at the axis of the machine element.

The machine element can also have three or more of the wall-like longitudinal structures, so that more than four of the cylinder sector-shaped hollow spaces are formed. Here, the wall-like longitudinal structures preferably each have the shape of a flat rectangular solid, wherein the wall-like longitudinal structures preferably cross in a single line.

The wall-like longitudinal structure transitions to the inner lateral surface of the hollow cylindrical base shape at transitions that are preferably rounded.

In special embodiments, the wall-like longitudinal structure has a varying thickness whose dimension is dependent on the distance to the axis.

In preferred embodiments of the arrangement according to the invention, the magnetic field sensor is arranged in the hollow space of the hollow-cylindrical base shape, in particular, in one of the cylindrical sector-shaped hollow spaces. Here, the machine element can also be provided for a rotating operation, wherein the electrical signal of the magnetic field sensor is to be transmitted, e.g., wirelessly.

In other preferred embodiments of the arrangement according to the invention, the magnetic field sensor is arranged fixed in position and at a distance to the machine element. Here, the magnetic field sensor is arranged outside of the hollow space of the hollow-cylindrical base shape. While the effective force or moment can cause movements or deformations of the machine element, the magnetic field sensor does not change its fixed position.

The magnetic field sensor can be designed as a secondary sensor and is preferably formed by a magnetic field density sensor or by a magnetic field intensity sensor. Basically any sensor type can be used as long as it is suitable for measuring the magnetic fields caused by the inverse magnetostrictive effect.

In preferred embodiments, the arrangement comprises several of the magnetic field sensors.

The sensor area of the machine element forms an integral component of the machine element and is preferably formed integrally with the other machine element.

The sensor area is preferably formed in a magnetoelastic section of the machine element. In the magnetoelastic section of the machine element, the machine element is preferably made from a magnetostrictive material. Preferably not only a section, but also the machine element as such has a magnetoelastic construction. In this case, the machine element is made from a magnetostrictive material. Alternatively, the sensor area can be constructed as a magnetostrictive layer within the wall-like longitudinal structure and within the hollow space of the hollow cylindrical base shape. This layer can be, for example, vapor-deposited.

The sensor area of the machine element preferably has the specified permanent magnetization, wherein the permanent magnetization is preferably closed. Alternatively or additionally, the arrangement according to the invention comprises the specified magnetizing elements for magnetizing the sensor area that can be formed, for example, by an electromagnet or by a permanent magnet. Alternatively, the magnetizing elements enable the introduction of an electric current into the machine element, which causes magnetization of the machine element in the sensor area.

The permanent magnetization or the magnetization that can be generated by the magnetizing elements is preferably oriented in a direction with a tangential component within the hollow-cylindrical base shape. Additionally, the permanent magnetization or the magnetization that can be generated by the magnetizing elements is preferably oriented in a direction with a radial component within the wall-like structure. Thus, the field lines of the magnetization close via the wall-like structure. In contrast, the field lines of the magnetization of a hollow-cylindrical machine element according to the prior art close only via the circumference of the hollow cylindrical shape.

The permanent magnetization or the magnetization that can be generated by the magnetizing elements can have different angles relative to the tangential direction within the hollow-cylindrical base shape. Preferably the permanent magnetization or the magnetization that can be generated by the magnetizing elements is oriented in the tangential direction within the hollow-cylindrical base shape.

The permanent magnetization or the magnetization that can be generated by the magnetizing elements can have different angles relative to the radial direction within the wall-like longitudinal structure. Preferably the permanent magnetization or the magnetization that can be generated by the magnetizing elements is oriented in the radial direction within the wall-like longitudinal structure.

The permanent magnetization or the magnetization that can be generated by the magnetizing elements is formed preferably in axial sections within the hollow-cylindrical base shape between which the polarity of the magnetization preferably changes.

The specified radial direction and the specified tangential direction are basically with respect to the axis of the machine element.

The machine element is formed in an especially preferred way by a hollow shaft or by a hollow flange.

The hollow shaft or the hollow flange can be designed for loading by different forces and moments. Preferably, the hollow shaft or the hollow flange has an annular toothed section on one or both axial ends, so that large torques can be transmitted. Alternatively or additionally, the hollow shaft or the hollow flange preferably has a receptacle that enables a securing of the hollow-cylindrical base shape on one or both axial ends.

BRIEF DESCRIPTION OF THE DRAWINGS

Additional advantages, details, and refinements of the invention are given from the following description of preferred embodiments with reference to the drawing. Shown are.

DETAILED DESCRIPTION OF THE PREFERRED EMBODIMENTS

Figure 1:
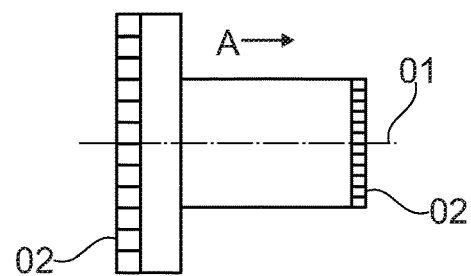
FIG. 1: a hollow flange of a preferred embodiment of the arrangement according to the invention.

FIG. 1 shows a machine element in the form of a hollow flange of a preferred embodiment of the arrangement according to the invention in a side view. The hollow flange has the shape of two axially adjacent hollow cylinders with different outer diameters and with equal inner diameters. The hollow flange has an axis 01 that also represents the axis of symmetry of the hollow flange. The hollow flange is exposed to different forces and moments, among other things, also normal forces and bending moments, which can be measured by the arrangement according to the invention.

On each of its axial ends, the hollow flange has a circular toothed section 02 on its outer circumference, so that large torques can be transmitted via the hollow flange.

Figure 2:
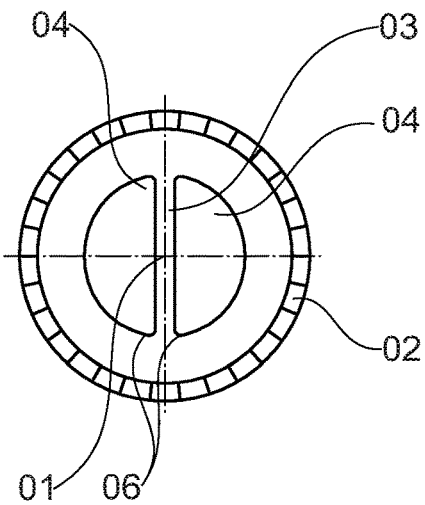
FIG. 2: the hollow flange shown in FIG. 1 in a cross-sectional view.

FIG. 2 shows the machine element shown in FIG. 1 in a cross-sectional view. The sectional plane is perpendicular to the axis 01. In this view, a wall-like longitudinal structure 03 can be detected that is formed in the hollow space of the hollow-cylindrical flange and divides this into two hollow-cylindrical sectors 04. The wall-like longitudinal structure 03 has the shape of a flat rectangular solid, whose line of symmetry coincides with the axis 01. The wall-like longitudinal structure 03 transitions at the rounded transitions 06 to the inner lateral surface of the hollow-cylindrical shape of the hollow flange. Due to these rounded transitions 06 and the thickness of the wall-like longitudinal structure 03, the shape of the two hollow-cylindrical sectors 04 deviates from the ideal shape of a cylindrical sector. The central angles of the hollow-cylindrical sectors 04 are each 180°.

The arrangement further comprises a magnetic field sensor 09 that is arranged in one of the hollow-cylindrical sectors 04 or outside of the hollow flange in the vicinity of the hollow flange.

Figure 3:
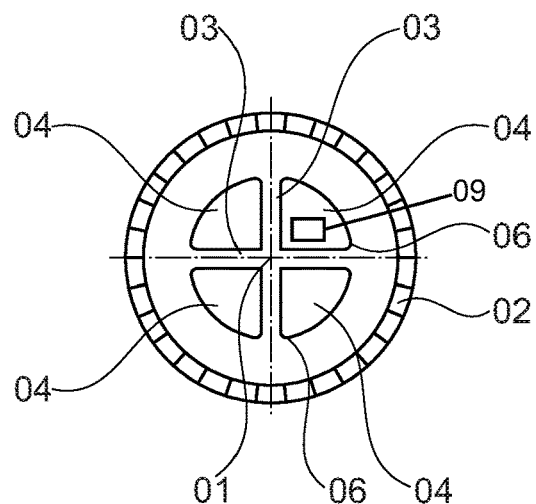
FIG. 3: a cross-sectional view of a hollow flange of a modified embodiment.

FIG. 3 shows a cross-sectional view of a hollow flange of a modified embodiment. The hollow flange is initially equivalent to the hollow flange shown in FIG. 1 and FIG. 2.

The difference is in that the hollow flange has two of the wall-like longitudinal structures 03. The two wall-like longitudinal structures 03 have identical constructions and intersect at the axis 01. Consequently, four of the hollow-cylindrical sectors 04 are formed, each of which has a central angle of 90°.

Figure 4:
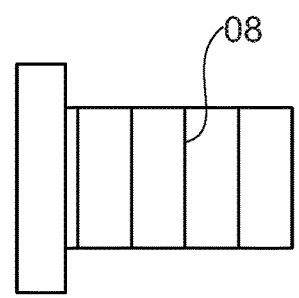
FIG. 4: a magnetization of the hollow flange shown in FIG. 1, FIG. 5: a magnetization of a modified embodiment.

FIG. 4 shows a magnetization 08 of the hollow flange shown in FIG. 1. The magnetization 08 runs tangentially along the circumference in axial sections between which the polarity of the magnetization changes.

Figure 5:
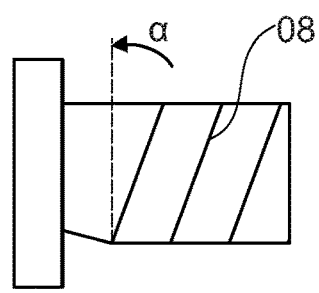

FIG. 5 shows a modified magnetization 08 of the hollow flange shown in FIG. 1. The magnetization 08 is initially identical to the magnetization shown in FIG. 4. One difference is in that the magnetization 08 is inclined at an angle α relative to the tangential direction. The angle α can be between 0° and 90°.

The magnetizations 08 shown in FIGS. 4 and 5 can also be realized in the hollow flange shown in FIG. 3.

Figure 6:
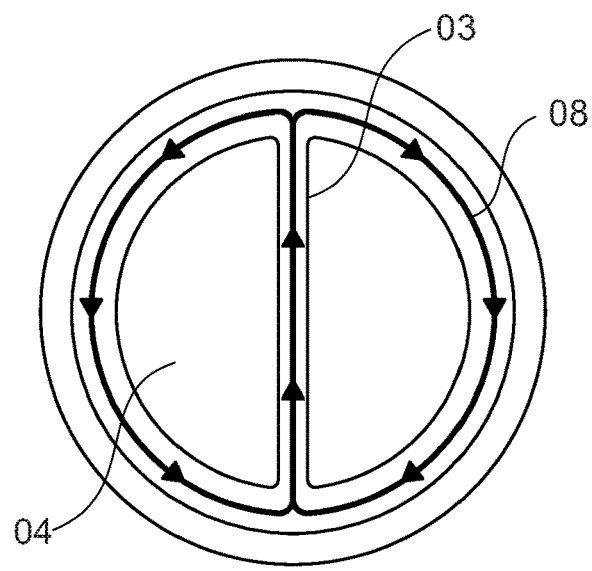
FIG. 6: the magnetization shown in FIG. 4 in a cross-sectional view.

FIG. 6 shows the magnetization shown in FIG. 4 in a cross-sectional view. In this view, it is to be seen that the magnetization 08 closes via the wall-like longitudinal structure 03.

LIST OF REFERENCE NUMBERS

01 Axis
02 Toothed section
03 Wall-like longitudinal structure
04 Hollow-cylindrical sectors
05 —
06 Transition
07 —
08 Magnetization
09 Magnetic field sensor

The invention claimed is:

1. An arrangement for measuring at least one of a force or a moment comprising:
a machine element that extends along an axis, the machine element including a sensor area with a hollow-cylindrical base shape, and the sensor area has a permanent magnetization,
at least one magnetic field sensor constructed for measuring at least one component of a magnetic field caused by the permanent magnetization of the sensor area and the force to be measured or by the moment to be measured,
wherein the machine element has a wall-shaped longitudinal structure in a hollow space of the hollow-cylindrical base shape and the wall-shaped longitudinal structure includes the permanent magnetization.

2. The arrangement according to claim 1, wherein the wall-shaped longitudinal structure extends in a plane that is parallel to the axis.

3. The arrangement according to claim 2, wherein the wall-shaped longitudinal structure extends in a plane surrounding the axis.

4. The arrangement according to claim 1, wherein the wall-shaped longitudinal structure divides the hollow space of the hollow-cylindrical base shape into hollow-cylindrical sectors.

5. The arrangement according to claim 4, wherein the hollow-cylindrical sectors each have a central angle of 180° or a whole number fraction of 180°.

6. The arrangement according to claim 4, wherein the machine element comprises two of the wall-shaped longitudinal structures that intersect at the axis, so that four of the hollow-cylindrical sectors are constructed.

7. The arrangement according to claim 1, wherein the wall-shaped longitudinal structure has a flat rectangular solid shape.

8. The arrangement according to claim 1, wherein the magnetic field sensor is arranged in one of the hollow-cylindrical sectors.

9. The arrangement according to claim 1, wherein the permanent magnetization is oriented in a direction with a tangential component in the hollow-cylindrical base shape and in a direction with a radial component in the wall-shaped structure.

10. The arrangement according to claim 1, wherein the machine element is formed by a hollow shaft or by a hollow flange.

11. The arrangement according to claim 1, wherein the wall-shaped longitudinal structure extends through the axis of the machine element.

* * * * *